(No Model.)
W. K. GORE.
BARBED FENCE.
No. 294,612. Patented Mar. 4, 1884.
Fig: 1.
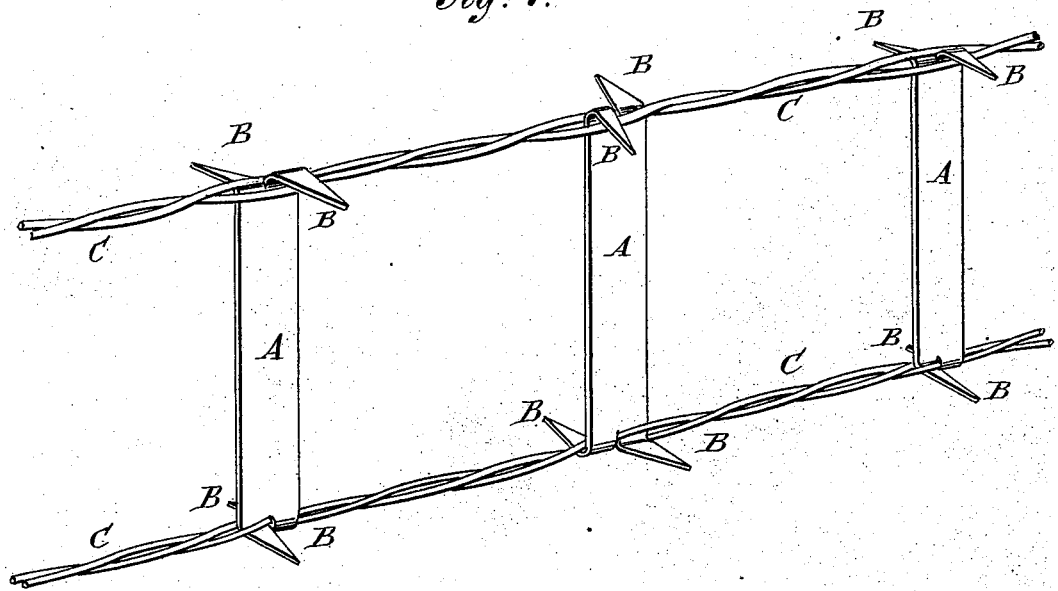
Fig: 2.
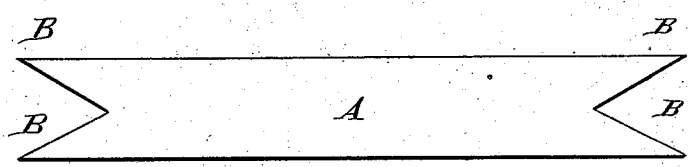
Fig: 3.
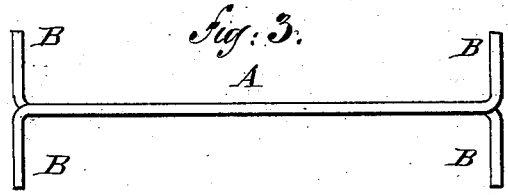
WITNESSES:
INVENTOR:
W. K. Gore
BY
ATTORNEYS.

UNITED STATES PATENT OFFICE.

WILLIS K. GORE, OF JOHNSTOWN, PENNSYLVANIA.

BARBED FENCE.

SPECIFICATION forming part of Letters Patent No. 294,612, dated March 4, 1884.

Application filed May 12, 1883. (No model.)

*To all whom it may concern:*

Be it known that I, WILLIS K. GORE, of Johnstown, in the county of Cambria and State of Pennsylvania, have invented a new and useful Improvement in Barbed Fences, of which the following is a full, clear, and exact description.

Reference is to be had to the accompanying drawings, forming a part of this specification, in which similar letters of reference indicate corresponding parts in all the figures.

Figure 1 is a perspective view of my improvement shown as applied to the wires of a fence. Fig. 2 is a plan view of one of the barbed braces and signals before the points are bent. Fig. 3 is an edge view of one of the barbed braces and signals after the points have been bent.

The object of this invention is to strengthen wire fences, cause them to be plainly seen, and prevent animals from rubbing against them on both sides.

A represents a plate or strip of hoop-iron, or other suitable material, of any desired width and thickness. The strips A have their ends notched, as shown in Fig. 2, to form points or barbs B, and are made of such a length that the bottoms of the end notches will be at a distance apart equal to the distance apart of the wires to which the said strips are to be applied. The strips A are applied to wires C, formed of two or more strands twisted together, one or both the points B at each end being passed between the strands of the wires and bent down in opposite directions over the wires C, and at right angles, or at any desired angle with the said wires. With this construction the strips A serve as braces to strengthen the fence, and as signals to make the fence visible, so that animals will not run against it.

The points B, when bent down, serve as barbs to prevent animals from rubbing against the fence and injuring it, but are not made so long as to injure the animals.

Having thus fully described my invention, I claim as new and desire to secure by Letters Patent—

In fences, a top and bottom rail formed of two wires twisted together, in combination with intermediate vertical plates, A, having at each end two barbs, B B, bent and passing in opposite directions through the twisted wires, as shown and described.

WILLIS K. GORE.

Witnesses:
R. T. GALLAGHER,
CHARLES ZIMMERMANN.